United States Patent [19]

Kinoshita et al.

[11] Patent Number: 4,901,160
[45] Date of Patent: Feb. 13, 1990

[54] ELECTRONIC CAMERA

[76] Inventors: Takao Kinoshita; Yoshiyuki Takishima, both of Kawasaki, Japan

[21] Appl. No.: 54,590
[22] PCT Filed: Sep. 13, 1986
[86] PCT No.: PCT/JP86/00479
 § 371 Date: May 12, 1987
 § 102(e) Date: May 12, 1987

[30] Foreign Application Priority Data

Sep. 13, 1985 [JP] Japan .................. 60-201745

[51] Int. Cl.⁴ .................. H04N 5/76; H04N 5/782
[52] U.S. Cl. .................. 358/335; 358/906; 360/10.1
[58] Field of Search .............. 358/335, 906, 312, 229; 360/10.1, 33.1

[56] References Cited

U.S. PATENT DOCUMENTS 4,604,668  8/1986  Lemelson ............... 358/906 X

FOREIGN PATENT DOCUMENTS 57-44374   3/1982  Japan .
58-182964  10/1983 Japan .
58-218004  12/1983 Japan .

OTHER PUBLICATIONS

Japanese article pp. 19-23, 11-15-83.

Primary Examiner—L. T. Hix
Assistant Examiner—D. Rutledge

[57] ABSTRACT

An electronic camera has an image pickup section and a detachable recording section. The image pickup section includes an image pickup element for converting an optical image into an analog image signal. The image pickup section also includes an analog-to-digital converter for converting the analog image signal into digital image signals which are stored in a digital memory within the image pickup section. The detachable recording section includes a digital-to-analog converter for converting the digital signal output from the image pickup section into an analog signal which is recorded in an analog memory within the recording section.

10 Claims, 7 Drawing Sheets

$V_D$ (VERTICAL SYNC)

ELECTRONIC CAMERA

BACKGROUND OF THE INVENTION

The present invention relates to an electronic camera, that is, a camera for electronically recording an optical image and, more particularly, to an electronic camera having a detachable recording section using a memory, such as a disk, as a recording means.

A conventional electronic camera of this type consists of an image pickup section for converting an optical image into an electrical signal and a disk recording section for electronically or magnetically recording the electrical signal.

Alternatively, an electronic camera of this type has a solid-state memory, instead of a disk recording section, as the recording means, in order to eliminate its drawbacks.

However, the art as described above has the following drawbacks.

First, an electronic camera having a disk recording section as the recording means has the following drawbacks:

(1) Since a recording disk and a disk drive for driving the same have predetermined size, miniaturization of the entire camera is limited.

(2) A predetermined time interval is required for a rise time of disk rotation when recording of an image is started, and a shutter release opportunity can be lost.

(3) The power consumption required for a disk servo is comparatively large, and disk servo time not contributing to recording is prolonged.

(4) The camera housing must be water- and dust-proofed due to the necessity of disk change, resulting in a high cost.

Meanwhile, an electronic camera using a solid-state memory as a recording means has the following drawbacks:

(1) It is difficult to increase the memory capacity exceeding a predetermined degree, and a maximum number of photographing frames is smaller than that of an electronic camera which uses a disk.

(2) Since cost reduction of the memory is limited, reduction in photographing cost is also limited.

(3) A semiconductor memory requires power to maintain data of a recorded optical image, and it is difficult to reserve it permanently.

(4) If a replaceable memory pack is used to overcome the problem of the limited maximum number of photographing frames, the camera housing must be water- and dust-proofed, resulting in a high cost.

SUMMARY OF THE INVENTION

Therefore, an electronic camera according to the present invention has an image pickup section including an image pickup element and a solid-state memory for recording at least one-frame of image signals from the image pickup element, and an external recording section including a non solid state memory means are provided separately. The image pickup section and the external recording section are detachable. The invention is characterized by comprising a voice pickup means for obtaining voice data to be recorded on the solid-state memory.

Embodiments of the present invention will be described in detail with reference to the accompanying drawings.

Figure 1:
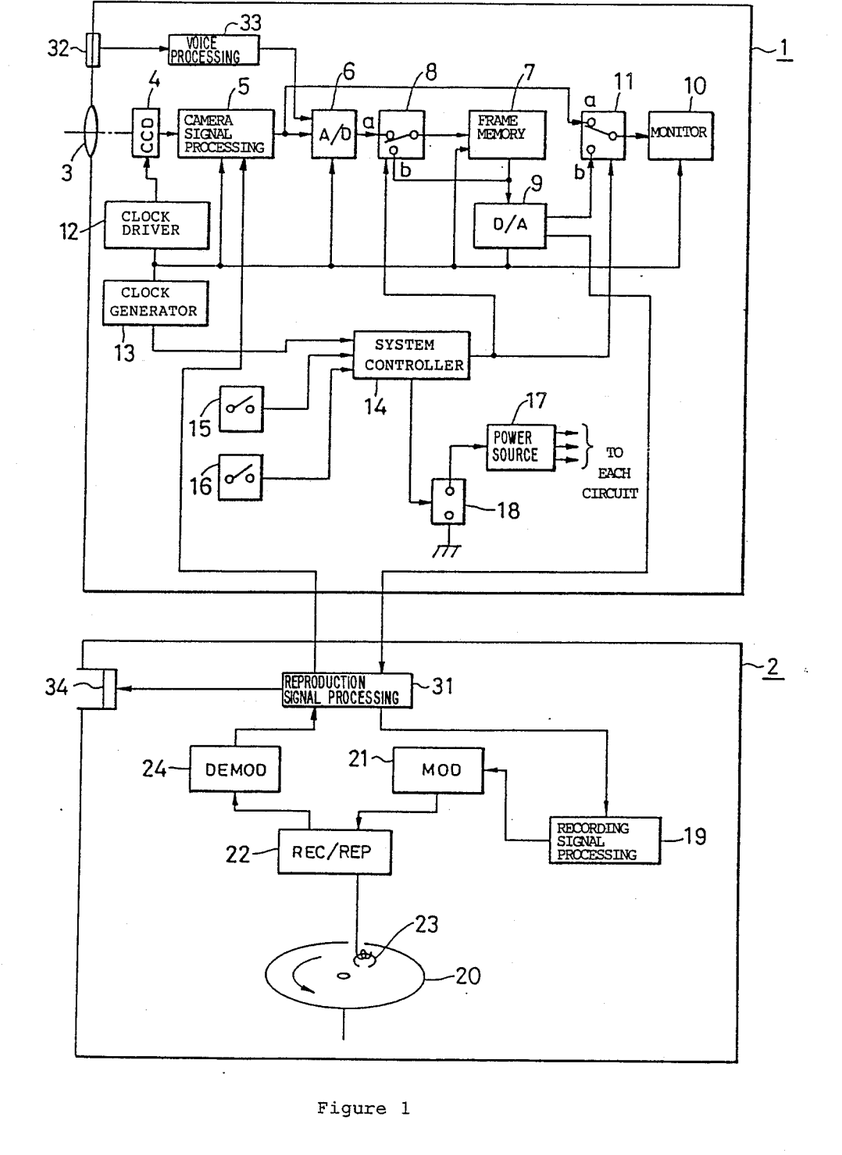
FIG. 1 is a block diagram of a first embodiment of the present invention.

FIG. 1 is a block diagram of an arrangement of an electronic camera according to an embodiment of the present invention.

The electronic camera of this embodiment basically comprises an image pickup section 1 and a disk recording section 2.

The image pickup section 1 has a lens 3 and an image pickup element 4. The image pickup element 4 forms an optical image from the lens 3 and converts the optical image into an electrical signal, i.e., an image signal. The image pickup element 4 comprises a known image pickup means such as CCD, a MOS, an image pickup tube and so on. A signal processing curcuit 5 processes the image signal from the image pickup element.

The image pickup section 1 also has an A/D converter 6 and a frame memory 7 for recording one-frame of digital image signals supplied from the A/D converter. The frame memory 7 can be field memory if needed. A nonvolatile DRAM is suitable as the frame memory 7. Therefore, a selection switch 8 is provided between the A/D converter 6 and the frame memory 7. When the frame memory 7 sequentially records incoming image signals, a contact a of the selection switch 8 is turned on. When a recording signal must be maintained, a contact b of the selection switch 8 is turned on. A recording signal is switched in this manner.

A D/A converter 9 converts a digital image signal read out from the frame memory 7 into an analog signal.

A monitor 10 displays an image signal as a visual image.

A second selection switch 11 is also provided. When a contact a of the second selection switch 11 is turned on, raw image signals obtained by the image pickup element 4 and sequentially supplied via the signal processor 5 are supplied to the monitor 10 and displayed on it. In this case, the monitor 10 serves as a view finder of the camera.

On the other hand, when a contact b of the second selection switch 11 is turned on, the image signal of the frame memory 7 is supplied to the monitor 10 via the D/A converter 9 and displayed on the monitor 10.

A clock driver 12 supplies a clock pulses from a clock generator 13 to the image pickup element 4, the signal processing circuit 5, the A/D converter 9, the monitor 10, and so on. The respective units of the image pickup section 1 are driven in accordance with the clock pulse.

A system controller 14 controls switching of the contacts of the selection switch 8 and the second selection switch 11 in accordance with the timing obtained by a release switch 15.

The system controller 14 is also driven by a clock from the clock signal generator 13.

A main switch 16 controls start/stop of the system controller.

A power source 17 and a power source switch 18 are provided. Power from the power source 17 is supplied to the respective units of the image pickup section 1 and the disk recording section 2.

The disk recording section 2 has a recording signal processing circuit 19. The recording signal processing circuit 19 performs signal processing in order to supply an analog signal, obtained by converting an image signal of the frame memory 7 by the D/A converter 9, to a recording disk to be described later.

The disk recording section 2 has a recording disk 20. The recording disk 20 uses a magnetic sheet as the disk medium. Another medium such as an optical recording medium and a photomagnetic recording medium can also be used.

An FM modulator 21 modulates an analog image signal from the D/A converter 9 into an FM signal and supplies the FM signal to the recording disk 20 when a recording disk is used as the magnetic medium.

A recording/reproduction amplifier 22 is used to amplify the signal when the signal is to be recorded on the magnetic disk 20 or when a signal described later is reproduced.

When a signal is recorded, a digital image signal can be recorded without being converted into an analog signal by the D/A converter 9. In this case, a signal to be recorded does not pass the D/A converter 9 but is directly supplied to the disk recording section 2.

When a digital signal is directly recorded on the recording disk 20, the recording signal processing circuit 19 performs the signal processing necessary for processing a DC component in the signal. In this case, the FM modulator 21 can be omitted. When a digital image signal is recorded, better image quality is obtained while the entire camera is simplified compared to the case wherein an analog image signal is recorded.

A recording/reproduction head 23 is used to record and reproduce a signal on and from the recording disk 20.

An FM demodulator 24 demodulates an FM reproduction signal supplied from the recording/reproduction amplifier 22. An analog image signal output from the FM demodulator 24 is supplied to the camera signal processing circuit 4 of the image pickup section 1. Therefore, the signal reproduced from the recording disk 20 can be displayed on the monitor 10 in the same manner as an image signal from the image pickup element 4.

A microphone 32 and a voice processing circuit 33 are provided. The voice processing circuit 33 processes a voice signal from the microphone 32 by time base compression or the like.

A loudspeaker 34 corrects a voice signal. In this embodiment, a voice signal as well as an image signal can be recorded.

More specifically, a voice signal picked up by the microphone 32 is time-base compressed by the voice processing circuit 33 into a time-base compressed voice signal having the same frequency band as that of an image signal supplied from the image pickup element 4.

A time-base compressed voice signal is short and has the same data amount as that of a longer voice signal. This signal is converted into a digital signal by the A/D converter 6 and recorded in the frame memory 7.

The time-base compressed signal is then transferred onto the recording disk 20 in the same manner as for an image signal.

When a signal is reproduced, it is derived as a time-base compressed voice signal by the FM demodulator 24 in the same manner as an image signal, time-base expanded to a voice signal of a normal frequency band and having a normal time length by the reproduction signal processing circuit 31, and reproduced by the loudspeaker 34.

The microphone 32 and the monitor 10 can be provided to one or both of the image pickup section 1 and the disk recording section 2.

Figure 2:
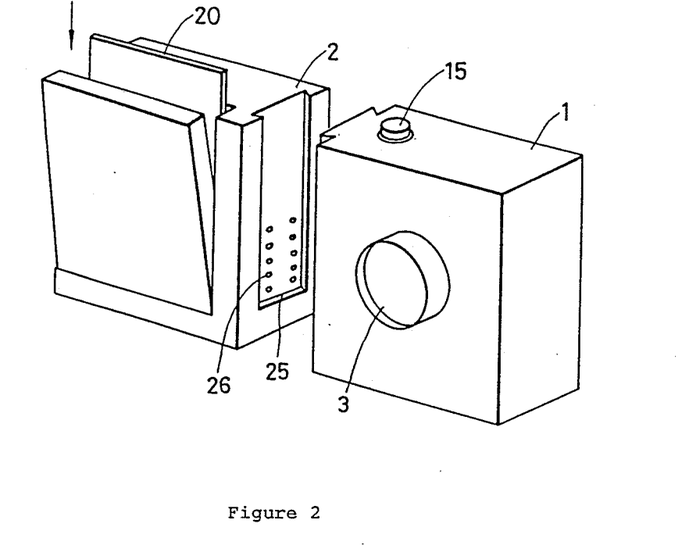
FIG. 2 shows an outer appearance of the first embodiment.

FIG. 2 shows an outer appearance of the electronic camera of the present invention. The same reference numerals are used to denote the same portions as in the block diagram of FIG. 1.

Referring to FIG. 2, a joint 25 includes a contact group 26 for electrically connecting the image pickup section 1 and the disk recording section 2.

With the above arrangement, the electronic camera of the present invention operates in the following manner.

The operation of the camera of the present invention will be described with reference to the flow chart shown in FIG. 3(a).

In step #1, the main switch 16 is turned on, and the system controller 14 is enabled.

In step #2, the power source switch 18 is turned on, and the contacts a of the selection switch 8 and the second selection switch 11 are turned on. In this step, power is supplied from the power source 17 to the respective portions to actuate them.

In this case, when an external optical image is projected on the image pickup element 4 through the lens 3, the image is converted into an electrical image signal, and the image signal is supplied to the monitor 10 through the contact a of the second selection switch 11 and displayed on the screen of the monitor 10. In other words, in this step the monitor 10 serves as the view finder of the camera.

Meanwhile, the system controller 14 generates a sync signal by a clock signal supplied from the clock generator 13. A vertical sync signal VD is generated every one frame period V, as shown in FIG. 3(b).

When the frame memory 7 is a field memory, the vertical sync signal VD is generated at a period of ½V.

Then, the flow advances to step #3 to turn on the release switch 15. The system controller 14 is driven and the vertical sync signal VD is supplied to the selection switch 8 and the second selection switch 11. When the vertical sync signal VD falls (step #4), the selection switch 8 and the second selection switch 11 are switched to their contacts b (step #5). Then, the signal data on the frame memory 7 is connected through the contacts b, the image is fixed, and a so-called image freeze state is obtained. The frozen image is supplied to the monitor 10 through the contact b of the second selection switch 11 and displayed on it.

At the same time, the frozen image is also supplied to the disk recording section 2 through the D/A converter 9. The one-frame frozen image is recorded on the recording disk 20.

When a next image is to be picked up, the release switch 15 is depressed again (step #6), and the flow returns to the state after step #1. When the release switch 15 is turned on again, the operations as described above are sequentially performed, and the next image is recorded on the recording disk 20.

The frame memory 7 has a small memory capacity of a limited frame number. However, if the memory capacity is greatly increased in the future, images of several tens of frames or more can be recorded.

In the camera of this embodiment, since an image recorded on the recording disk 20 can also be displayed on the monitor 10 via the signal processing circuit 5, an image once stored in the recording disk 20 can be visually observed.

In this embodiment, the electronic camera has a separate image pickup section 1 and a detachable disk recording section 2, as described above. After an image signal and a time-base compressed voice signal are temporarily stored in the frame memory 7, the image signal and the voice signal are transferred to the disk recording section 2. Therefore, a shutter release opportunity will not be lost due to a delay in the starting timing of the recording disk 20. The image pickup section 1 can be made small and lightweight. When peak power is decreased to decrease the power source load on the image pickup section 1, a signal is read out from the image pickup element 4 at a low speed and temporarily stored in the frame memory 7. Therefore, the number of photographing frames can be increased compared to a conventional electronic camera even with a cell of the same capacity. Once image and voice signals are stored in the frame memory 7, the image pickup section 1 is connected to the disk recording section 2, and the image and voice signals can be transferred from the frame memory 7 to the recording disk 20 at a normal speed.

The content of the frame memory 7 can be reproduced and displayed on the monitor 10 through the D/A converter 9. When a given image is an unnecessary image, the corresponding memory area of the recording disk 20 can store a new image.

Figure 4:
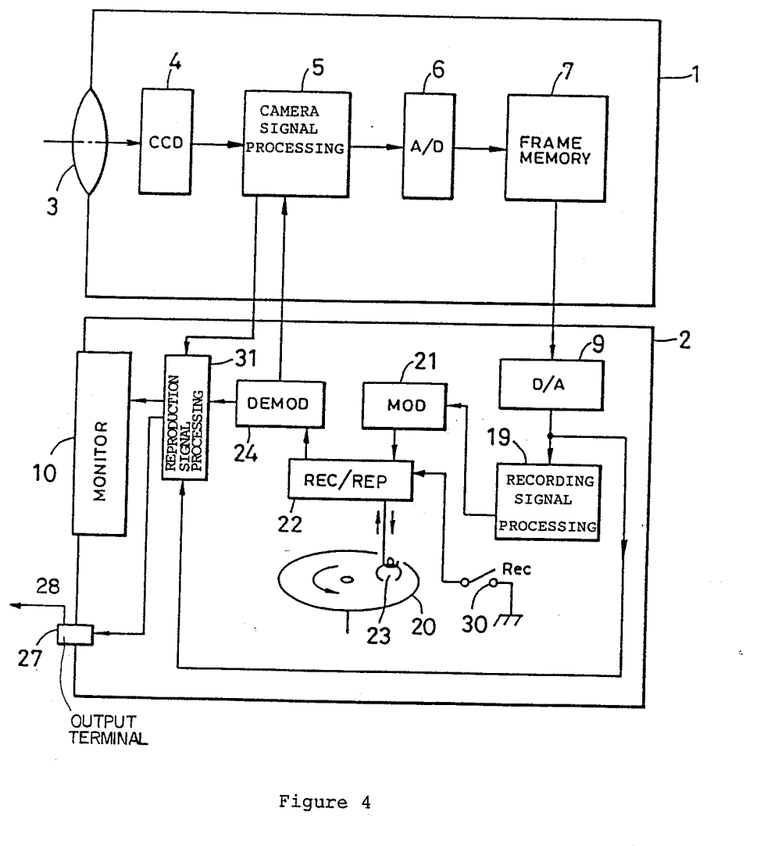
FIG. 4 is a block diagram of a second embodiment of the present invention.

FIG. 4 shows a second embodiment of the present invention. In FIG. 4, the portions denoted with the same reference numerals as in FIG. 1 operate in the same manner as the first embodiment and a detailed description therefor is omitted. Some necessary circuits shown in detail in FIG. 1 are not shown in FIG. 4. However, an image pickup section 1 has the same arrangement and operation as those of the first embodiment.

Figure 5:
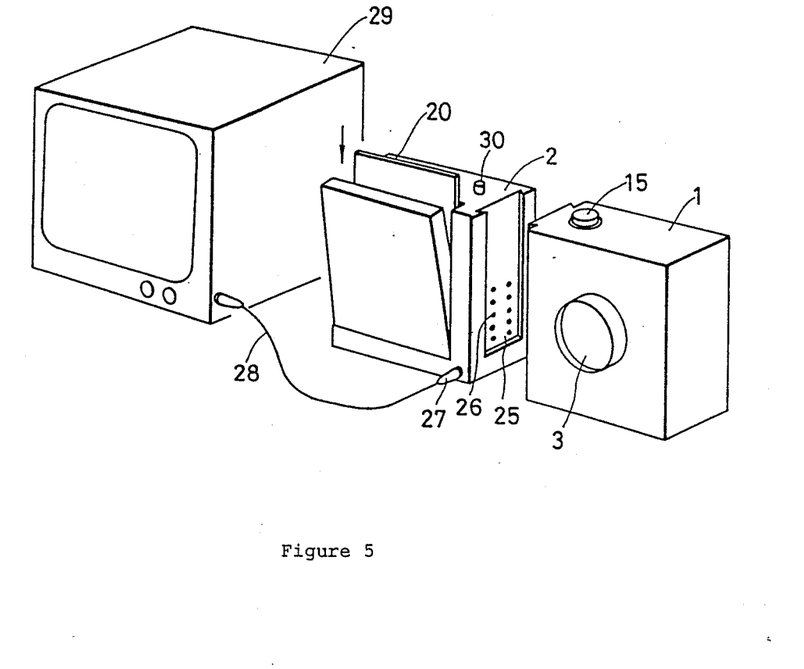
FIG. 5 shows an outer appearance of the second embodiment.

FIG. 5 shows an outer appearance of the second embodiment. Referring to FIGS. 4 and 5, an output terminal 27 for supplying an image signal to outside picks up an image signal displayed on the monitor 10 and displays it, through a cable 28, on a television monitor 29.

A switch 30 controls the start of a recording/reproduction amplifier 22. The switch 30 is usd to determine whether an image in frame memory 7 of the image pickup section 1 is recorded on a disk 20. When the switch 30 is lightly depressed, a current image is not recorded on the disk 20 but a next image in the frame memory 7 is transferred. When the switch 30 is strongly depressed, a current image in the frame memory 7 is transferred, and both the frame memory 7 and the recording disk 20 can pick up and record a new image. The operation is shifted in this manner.

When the image pickup section 1 and the disk recording section 2 are connected, the content of the frame memory 7 of the image pickup section can be automatically and sequentially transferred at once. In this case, it is easy to increase the number of recording frames of the frame memory 7 and to display these frames. Although the connection of the image pickup section 1 and the disk recording section 2 is not shown, they can be connected through a wire or without a wire.

In this embodiment, the monitor 10 is provided on the disk recording section 2.

A reproduction signal processor 31 receives a reproduction signal from an FM demodulator 24, an image signal in the frame memory 7 supplied from D/A converter 9, and an input image signal supplied from an image pickup element 4 through a signal processor 5, and supplies them to the monitor 10 and the output terminal 27. The reproduction signal processor 31 also expands the time-base compressed voice signal on a time base, as described above.

Figure 3:
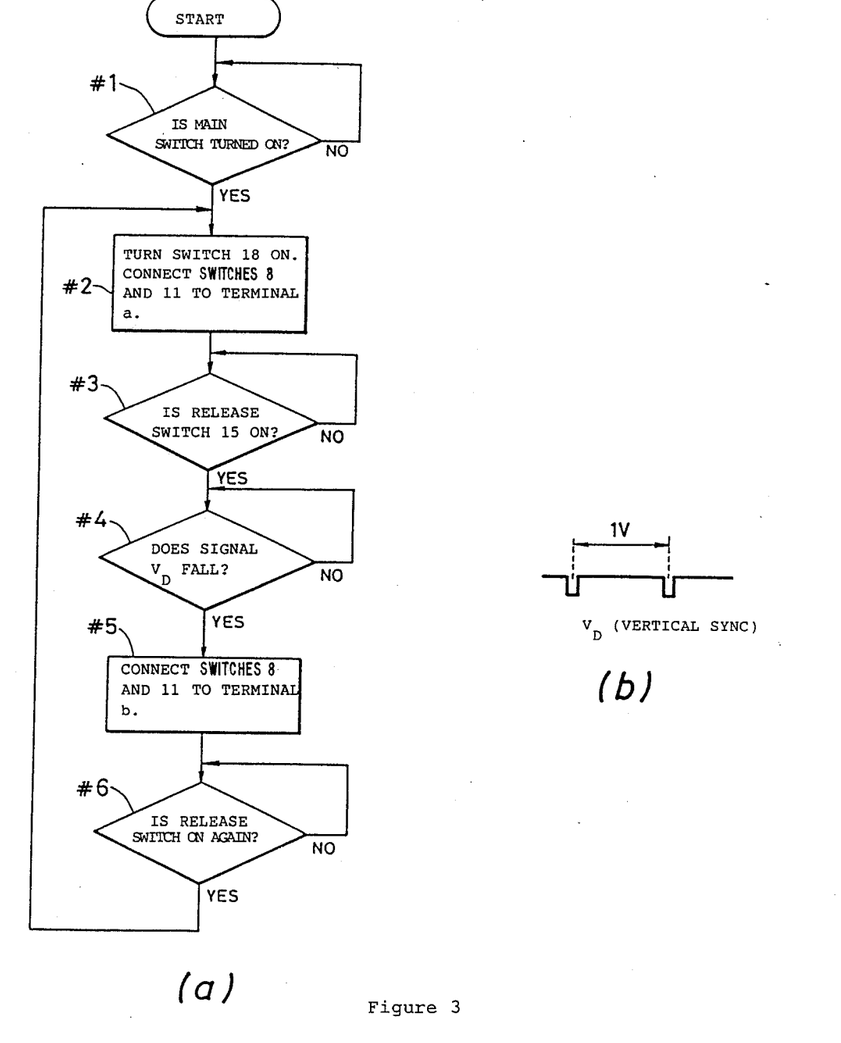
FIG. 3(a) shows a flow chart and FIG. 3(b) shows a waveform chart of the operation of the first embodiment.
Figure 6:
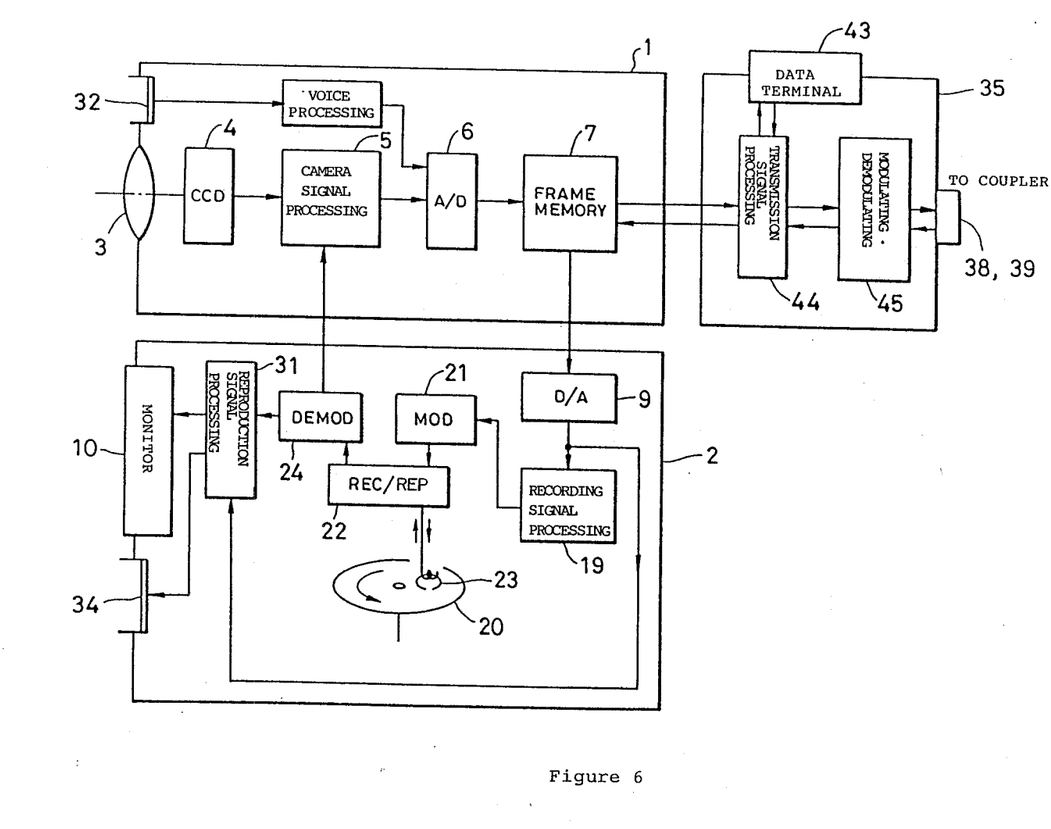
FIG. 6 is a block diagram of a third embodiment of the present invention.
Figure 7:
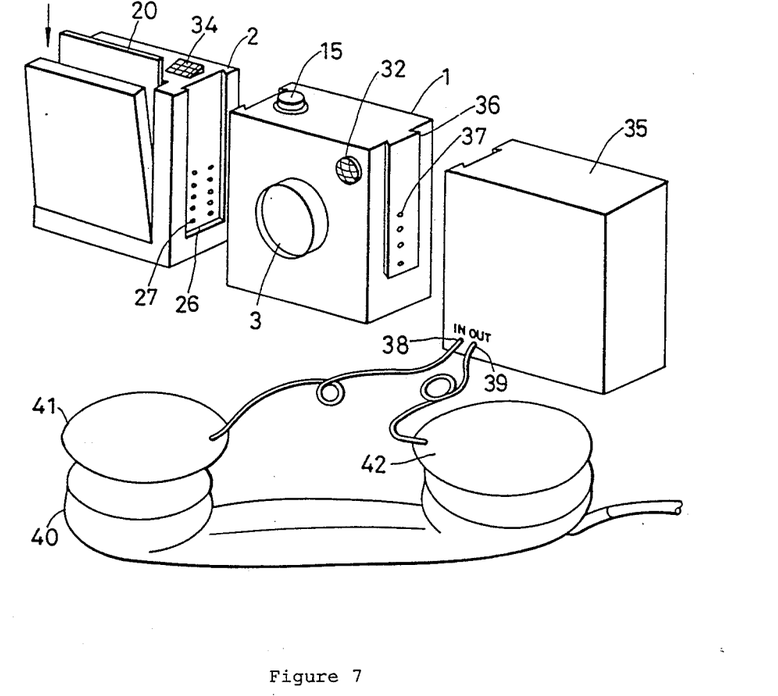
FIG. 7 shows an outer appearance of the third embodiment.

FIG. 6 is a block diagram of the embodiment shown in FIG. 3, and FIG. 7 shows an outer appearance of the same. The portions denoted by the same reference numerals are identical to those of other embodiments, and a detailed description therefor is omitted.

A telephone set 35 is provided. A member 36 connects an image pickup section 1 and the telephone set 35. A contact group 37 performs electrical connection.

Terminals 38 and 39 serve as interfaces with a receiver 40 of the telephone set and are connected to voice couplers 41 and 42 opposing the receiver 40.

The telephone transmission section 35 has a data input/output terminal 43. Therefore, the frame memory 7 can be controlled through a transmission signal processing circuit 44, and data of an image signal in the frame memory 7 can be output. The terminal 43 can be a general microcomputer terminal and can be coupled to a microcomputer display, a printer, a disk memroy and so on with a known method.

A voice signal from a microphone 32, an image signal from the image pickup element 4, and an image signal and a time-base compressed voice signal recorded in the frame memory 7 are modulated by a modulator/demodulator 45 through the transmission signal processing circuit 44, and converted into a carrier which is transmitted via a telephone line through the terminals 38 and 39.

Similarly, when an image signal and a voice signal obtained and picked up at another timing are transmitted through the telephone line, they are input through the terminals 38 and 39, are demodulated by the modulator/demodulator 45 to have the base band, and reach the image pickup section 1 through the transmission signal processing circuit 44. In the image pickup section 1, the signals are transferred to the frame memory 7 and recorded and displayed in the same manner as described above.

In the above embodiment, the image pickup section 1 and the telephone transmission section 35 are connected. However, the same effect can be obtained when a disk recording section 2 and the telephone transmission section 35 are connected.

Note that a solid-state memory performs data accessing for recording/reproduction in a non-mechanical manner and includes a magnetic bubble memory or the like.

A non solid-state memory performs data accessing for recording/reproduction in a mechanical manner and includes a VTR or the like.

As described above, according to the present invention, since an image pickup section having a frame memory and a disk recording section are separated, the following effects can be obtained:

(1) A camera for picking up an optical image, i.e., an image pickup section can be made small.

(2) Since the non solid-state memory such as a disk is not driven for photographing, photographing timing is not delayed, i.e., a shutter release opportunity is not lost.

(3) Since the non solid-state memory such as a disk is not driven for photographing, power consumption can be reduced.

(4) The camera housing can easily be water- and dust-proofed.

(5) Photographing; reproduction, dubbing, and filing of an image or voice; and monitoring of the respective operation steps can be easily performed.

(6) The entire system can be easily extended for voice recording, telephone transmission, and data recording.

We claim:

1. An electronic camera system comprising:
a camera unit including an image pickup element and digital memory means for recording at least one frame of digital image signals supplied from said image pickup element; and
an external recording unit including an analog memory means,
wherein said external recording unit is capable of being removably mounted on said camera unit,
and wherein said external recording unit receives said digital image signal recorded in said digital memory means from said camera unit and converts the received digital image signal into an analog signal for recording on said analog memory means.

2. An electronic camera according to claim 1, wherein said camera unit has voice pickup means for obtaining voice data to be recorded in said digital memory means, and voice reproducing means.

3. An electronic camera according to claim 1, wherein said external recording unit has voice pickup means for obtaining voice data to be recorded in said analog memory means, and voice reproducing means.

4. An electronic camera according to claim 1, wherein said camera unit has a telephone transmission section.

5. An electronic camera according to claim 1, wherein said external recording unit has a telephone transmission section.

6. An electronic camera according to claim 5, wherein said telephone transmission section includes a data input/output terminal.

7. An electronic camera according to claim 1, wherein said digital memory means includes a solid-state memory.

8. An electronic camera according to claim 1, wherein said analog memory means includes a disc-shaped magnetic medium.

9. An electronic still video camera system comprising:
camera apparatus including (1) image pickup means for converting an optical image into an electrical image signal, (2) analog to digital converting means for converting said electrical image signal into a digital image signal, (3) digital memory means for memorizing said digital image signal, and (4) output terminal means for outputting from said camera apparatus the digital image signal memorized in said digital memory means; and
recording apparatus which is capable of being detachably mounted on said camera apparatus, said recording apparatus including analog memory means, input terminal means for inputting the digital image signal from said output terminal means into said analog memory means, and digital to analog converting means for converting the digital image signal input by said input terminal means into an analog image signal.

10. An electronic still video camera system according to claim 9, wherein said digital memory means is capable of memorizing digital images of a plurality of frames.

* * * * *